Sept. 21, 1926. 1,600,729
W. R. GREEN
AUXILIARY TIRE CARRIER
Filed March 2, 1925 2 Sheets-Sheet 1
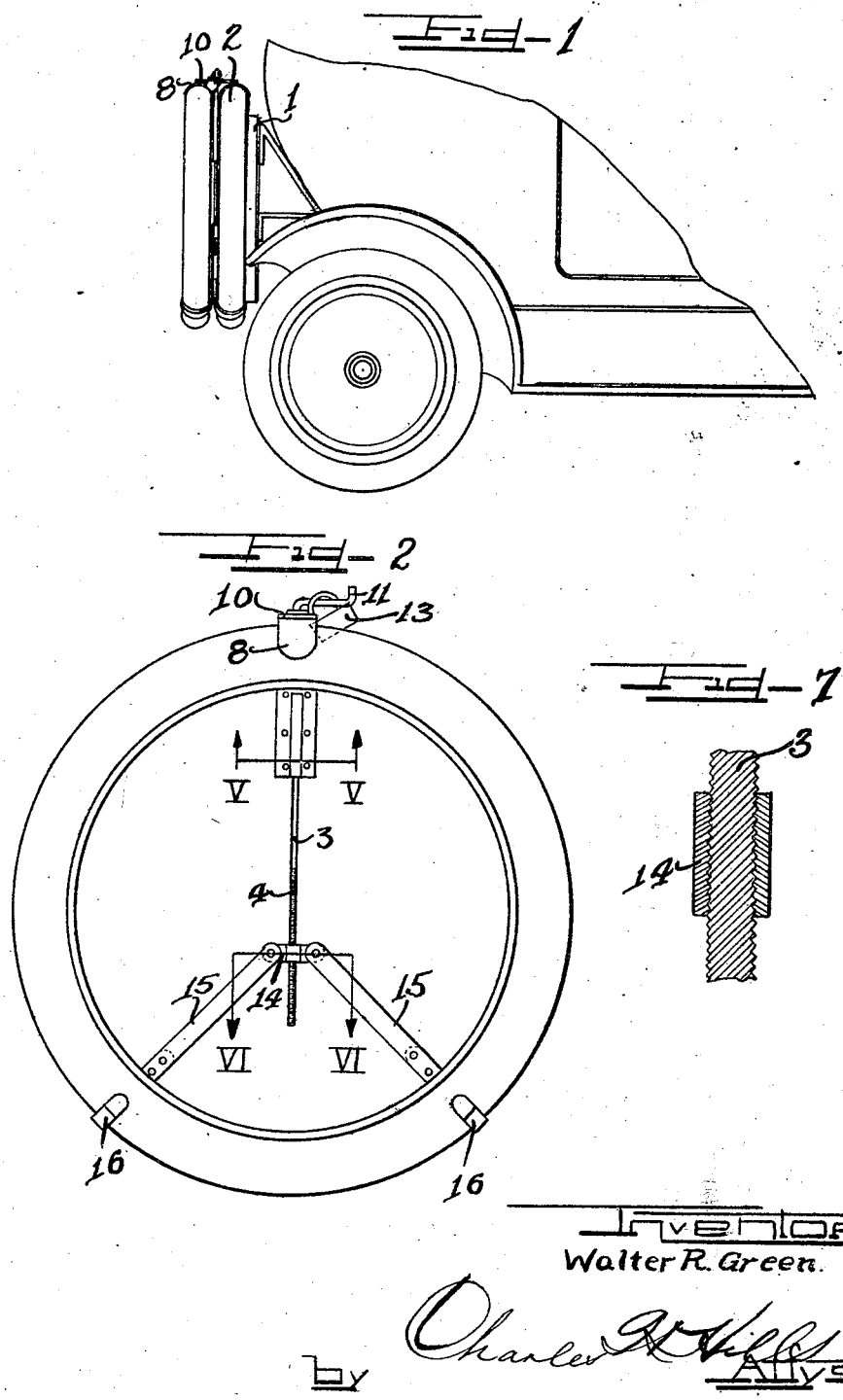

Sept. 21, 1926.  
W. R. GREEN  
1,600,729  
AUXILIARY TIRE CARRIER  
Filed March 2, 1925  
2 Sheets-Sheet 2
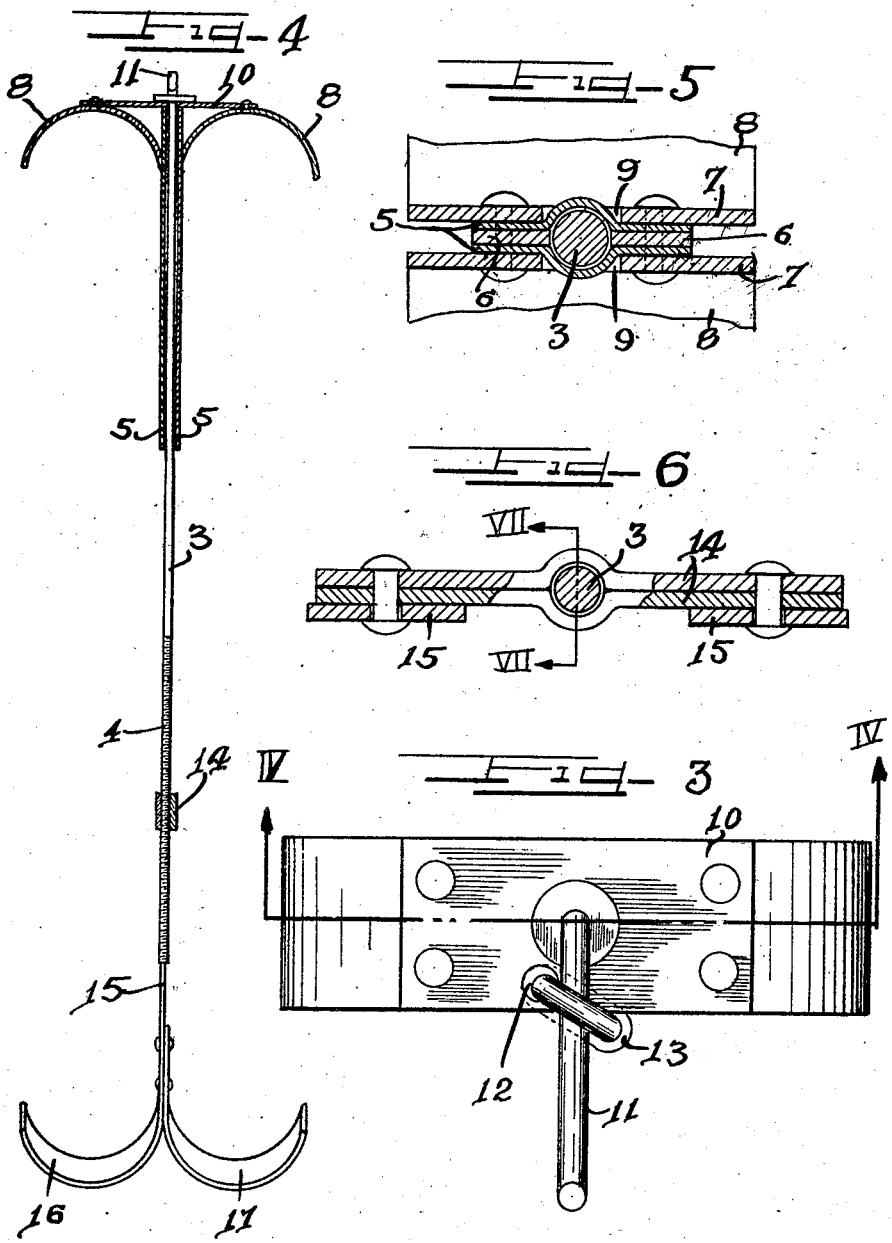
Inventor  
Walter R. Green  
by Charles H. Hill Attys Patented Sept. 21, 1926.

1,600,729

UNITED STATES PATENT OFFICE.

WALTER R. GREEN, OF CHICAGO, ILLINOIS.

AUXILIARY TIRE CARRIER.

Application filed March 2, 1925. Serial No. 12,496.

This invention relates to an auxiliary tire carrier and concerns itself with a structure that can be readily suspended from a supported tire and that can be readily adjusted for assembling or disassembling a tire.

The invention comprises the novel structure and combinations of parts hereinafter described and more particularly pointed out and defined in the appended claims.

In the accompanying drawings which illustrate a preferred embodiment of this invention and in which similar reference numerals refer to similar features in the different views:

Figure 1 is a fragmentary side elevational view of an automobile equipped with a standard tire carrier and my auxiliary tire carrier.

Figure 2 is an enlarged elevational view of a tire supported upon the auxiliary carrier.

Figure 3 is an enlarged top plan view of the carrier.

Figure 4 is an enlarged part section and part elevational view of the auxiliary tire carrier.

Figure 5 is an enlarged sectional view upon the line V—V of Figure 2.

Figure 6 is an enlarged sectional view upon the line VI—VI of Figure 2.

Figure 7 is an enlarged sectional view upon the line VII—VII of Figure 6.

This auxiliary carrier broadly comprises relatively adjustable members, each member having tire supporting means and attaching means and a rod for relatively adjusting said members and a lock for locking said rod against operation.

Referring to the drawings, there is shown a standard tire carrier 1 which usually comprises a part of the regular or standard equipment of an automobile. A tire 2 is supported upon this carrier. My auxiliary tire carrier is adapted to be suspended from the supported tire 2.

This auxiliary tire carrier comprises a vertical rod 3, the lower portion of which is threaded as indicated at 4. The upper portion of the rod is smooth and upon this smooth portion there is supported one of said members comprising a tire holding and suspension bracket. This bracket consists of a pair of plates 5 which are stamped intermediate their ends with concave recesses to fit the rod 3. Filler blocks 6 are positioned between these plates. A pair of plate members 7, each having an arcuate shoe 8 upon its upper end, and a central slot 9 below the shoe to receive the rib formed by the concave recess of a plate 5 are provided. The plate members 7 are bolted or riveted in parallel relation upon opposite sides of the structure formed by the plates 5 and fillers 6. A transverse plate or bridge member 10 is connected to the top of the shoes 8. The rod 3 extends through the bridge member 10 and its upper end is in the form of a crank handle 11 whereby the rod may be rotated. An aperture 12 is formed in a suitable location upon the bridge member 10 to receive the hasp of a padlock 13 for locking the crank handle 11 against effective movement. The other member is in the form of a cross head 14 threaded upon the threaded portion 4 of the rod 3. This cross head is preferably formed of a pair of metal plates each of which has a semicircular recess intermediate its ends to fit the rod 3. These metal plates are bolted together with the rod between them. A link 15 is pivoted upon each end of the cross head. The lower end of each link curves upwardly to form a shoe 16. A second shoe 17 is secured to each link in opposed relation to the shoe 16.

The lower portion of this auxiliary carrier as well as the upper portion comprises hence a pair of oppositely directed shoes. The shoes on one side of the carrier are adapted to be utilized for attaching the carrier to a supported tire such as the tire 2, while the shoes upon the other side of the carrier are adapted for carrying an extra tire.

The extra tire may be assembled or disassembled with respect to the auxiliary carrier by rotating the rod 3 for raising or lowering the cross head upon which the links 15 and lower shoes are mounted. On account of the adjustability of the cross head, it will be readily apparent that different sized tires may also be supported upon this auxiliary carrier.

It will be appreciated that when the auxiliary carrier is suspended upon a supported tire, the screw rod 3 will draw the upper and lower shoes together and firmly clamp the same upon the supported tire. Then when the padlock is applied, the auxiliary carrier is firmly locked upon the supported tire and at the same time the extra tire is firmly locked against removal from the auxiliary tire. Thus the operation of the screw rod 3 and padlock perform a dual function of locking the auxiliary carrier against unauthorized removal and at the same time locking the extra tire supported thereby against unauthorized removal.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a tire carrier, a rod, a pair of opposed plates secured upon said rod, a downwardly curved supporting shoe upon one plate, a downwardly curved tire supporting shoe upon the other plate, a bridging connected to the tops of said shoes and affording a support for said rod, a cross head threaded upon said rod, a pair of arms pivoted to said cross head and a pair of shoes upon each arm.

2. An auxiliary tire carrier, comprising a bracket having opposed shoes, a rod extending rotatably thru said bracket and having a crank arm at the upper end rotatably supported on said bracket, tire supporting means adjustably supported on said rod, and means for locking said crank arm to said bracket against unauthorized rotation.

In testimony whereof I have hereunto subscribed my name.

WALTER R. GREEN.